(12) United States Patent
Riedel et al.

(10) Patent No.: US 10,974,833 B2
(45) Date of Patent: Apr. 13, 2021

(54) PASSENGER SEAT ENTERTAINMENT SYSTEM

(71) Applicant: Safran Seats USA LLC, Gainesville, TX (US)

(72) Inventors: Lukas Riedel, Gothenburg (SE); Domenico Iacoviello, Manfredonia (IT); Emma Erkelens, Delft (NL); Emma Wisse, Delft (NL); David Randles, Delft (NL); Max Kersten, Delft (NL)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/348,479

(22) PCT Filed: Aug. 11, 2017

(86) PCT No.: PCT/US2017/046413
§ 371 (c)(1),
(2) Date: May 8, 2019

(87) PCT Pub. No.: WO2018/089069
PCT Pub. Date: May 17, 2018

(65) Prior Publication Data
US 2019/0359334 A1    Nov. 28, 2019

Related U.S. Application Data

(60) Provisional application No. 62/420,325, filed on Nov. 10, 2016.

(51) Int. Cl.
*B64D 11/00*    (2006.01)
*A47C 7/72*    (2006.01)

(52) U.S. Cl.
CPC ............ *B64D 11/0015* (2013.01); *A47C 7/72* (2013.01)

(58) Field of Classification Search
CPC ............................. B64D 11/0015; A47C 7/72
(Continued)

(56) References Cited

U.S. PATENT DOCUMENTS 6,194,853 B1 *   2/2001   Tual ................... G05B 19/0421
                                                  244/118.6
7,163,263 B1 *   1/2007   Kurrasch ............. A47C 1/0242
                                                  297/217.3
(Continued)

FOREIGN PATENT DOCUMENTS

EP      2093101 A1    8/2009
JP      2016144988 A  8/2016
WO      2009062974 A1 5/2009

OTHER PUBLICATIONS

Van De Westelaken et al., Integrating Gesture Recognition in Airplane Seats for In-Flight Entertainment, Network and Parallel Computing, Nov. 10, 2010, Springer International Publishing, Cham 032548, XP055416961, ISSN: 0302-9743, ISBN: 978-3-642-27168-7, vol. 5093.

(Continued)

*Primary Examiner* — Mark R Wendell
(74) *Attorney, Agent, or Firm* — Kilpatrick Townsend & Stockton LLP

(57) ABSTRACT

A passenger seat, such as an aircraft passenger seat, includes a seat base and an entertainment system. The seat base includes a cushioning member and a cover covering the cushioning member. The entertainment system is positioned between the cushioning member and the cover and is removably connected to the cushioning member. The entertainment system is configured to determine a force caused (Continued)

by a passenger's legs in at least two locations on an upper surface of the seat base when used.

12 Claims, 12 Drawing Sheets

(58) Field of Classification Search
USPC .................................................. 297/217.3
See application file for complete search history.

(56) References Cited

U.S. PATENT DOCUMENTS

| | | | | |
|---|---|---|---|---|
| 8,903,311 | B1* | 12/2014 | Maryanka | ............... H01P 3/121 455/41.1 |
| 2004/0262958 | A1* | 12/2004 | Young | ................... B60N 2/002 297/217.3 |
| 2009/0243868 | A1* | 10/2009 | Wentland | ........... B64D 11/0624 340/652 |
| 2010/0308166 | A1 | 12/2010 | Bovelli et al. | |
| 2011/0080288 | A1* | 4/2011 | Younse | ................ B60N 2/2881 340/573.1 |
| 2011/0248534 | A1* | 10/2011 | Pinto Ribeiro | ........ B60N 2/002 297/217.1 |
| 2011/0275939 | A1* | 11/2011 | Walsh | .................. G09B 19/003 600/473 |
| 2017/0283086 | A1* | 10/2017 | Garing | ............... B64D 45/0005 |
| 2017/0350773 | A1* | 12/2017 | Ma | ........................ C09D 165/00 |
| 2018/0056814 | A1* | 3/2018 | Tanyi | ..................... B60N 2/002 |

OTHER PUBLICATIONS

International Patent Application No. PCT/US2017/046413, Search Report and Written Opinion, dated Nov. 2, 2017.
International Patent Application No. PCT/US2017/046413, International Preliminary Report on Patentability, dated May 23, 2019.

* cited by examiner

PASSENGER SEAT ENTERTAINMENT SYSTEM

REFERENCE TO RELATED APPLICATIONS

This application claims the benefit of U.S. Provisional Application No. 62/420,325, filed Nov. 10, 2016 and entitled THE REVITALISATION SYSTEM, the content of which is hereby incorporated by reference in its entirety.

FIELD OF THE INVENTION

This application relates to passenger seats, and more particularly to an entertainment system for a passenger seat.

BACKGROUND

Passenger vehicles, such as aircraft, buses, trains, ships, and automobiles, include passenger seats for passengers to sit in during travel. While passenger seats are designed to provide comfort the passenger, many passengers become fatigued and stiff when forced to remain seated for long durations (such as on long-haul flights) because their movement is relatively limited. Moreover, passengers may be less motivated to move about a cabin of the passenger vehicle at the risk of inconveniencing other passengers or drawing attention to themselves. The stiffness and fatigue from limited movement may cause discomfort during travel and continue to affect the passenger even after they have exited the passenger vehicle and are no longer travelling. The limited movement may further potentially cause health issues or other problems with the passengers. Such discomfort detracts from the passenger travel experience, and may discourage the passenger from travelling often or opting for other means of transport. Therefore, there is a need for a passenger seat that improves the passenger travel experience.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a passenger seat includes a seat base and an entertainment system. The seat base includes a cushioning member and a cover that covers the cushioning member. The entertainment system is positioned between the cushioning member and the cover, and includes a first sensor at a first location and a second sensor at a second location. The entertainment system is positioned such that the first sensor and the second sensor are aligned with a passenger's legs when used. The first sensor and the second sensor are configured to detect a force applied by the passenger's legs on the entertainment system when used.

In some examples, the cushioning member includes a forward edge and an aft edge. A distance between the first sensor and the second sensor is a spacing distance, and the first sensor and the second sensor are positioned at an edge distance from the forward edge. In some examples, the edge distance is less than the spacing distance.

In various examples, the first sensor and the second sensor each include at least one of a piezoelectric textile sensor, a force sensor resistor, a strain gauge sensor, an accelerometer, or a foam sensor.

According to some aspects, the entertainment system further includes a base having a first side edge, a second side edge, an upper surface, and a lower surface. In various examples, the first sensor and the second sensor are secured on the upper surface of the base between the first side edge and the second side edge. In certain examples, the base further includes a center section between the first side edge and the second side edge, a first flexible section between the center section and the first side edge, and a second flexible section between the center section and the second side edge. In various aspects, the first flexible section and the second flexible section include a first fabric material and the center section includes a second fabric material different from the first fabric material. In some examples, the first fabric material is more elastic than the second fabric material, and the first sensor and the second sensor are secured on the center section.

In certain examples, the entertainment system further includes a controller secured to the base and configured to communicate with the first sensor and the second sensor to receive sensed force data and communicate the sensed force data with an In-Flight Entertainment (IFE) device such that the IFE device runs an application based on the sensed force data.

In some examples, the cover includes an inner surface and an outer surface, and the outer surface includes a first indicator corresponding with the first sensor and a second indicator corresponding with the second sensor.

According to certain examples, an entertainment system for a passenger seat includes a base, a first sensor, and a second sensor. The base includes a first side edge, a second side edge, an upper surface, and a lower surface. The first sensor is secured to the upper surface of the base between the first side edge and the second side edge, and the second sensor is secured to the upper surface of the base between the first sensor and the second side edge. The first sensor and the second sensor are each configured to detect a force applied to the entertainment system, and the base is configured to be positioned between a cushioning member and a cover of a base of a passenger seat.

In some examples, the entertainment system includes a controller secured to the base and configured to communicate with the first sensor and the second sensor to receive sensed force data and communicate the sensed force data with an IFE device.

In various aspects, the base further includes a center section between the first side edge and the second side edge, a first flexible section between the center section and the first side edge, and a second flexible section between the center section and the second side edge. In some examples, the first flexible section and the second flexible section include a first fabric material, and the center section includes a second fabric material different from the first fabric material. In certain aspects, the first fabric material is more elastic than the second fabric material, and the first sensor and the second sensor are secured on the center section. According to some examples, the first fabric material includes knitted nylon, and the second fabric material includes woven nylon.

In certain examples, the entertainment system further includes a sleeve slidably positioned around at least the center section.

In various cases, the entertainment system includes a base cushion fastener on the lower surface of the base and a cover fastener on the upper surface of the base.

In some aspects, the spacing distance is from about 170 mm to about 210 mm.

In various examples, the entertainment system further includes a first connector on the lower surface of the base and adjacent to the first side edge and a second connector on the lower surface of the base and adjacent to the second side edge. The first connector and the second connector are configured to removably connect the entertainment system to the cushioning member.

According to certain examples, a passenger seat includes a seat base and an entertainment system. The seat base includes a cushioning member and a cover covering the cushioning member. The entertainment system is positioned between the cushioning member and the cover and is removably connected to the cushioning member. The entertainment system is configured to determine a force caused by a passenger's legs in at least two locations on an upper surface of the seat base when used.

In some aspects, the entertainment system includes a first sensor at a first location and a second sensor at a second location. According to some examples, the entertainment system is positioned such that the first sensor and the second sensor are aligned with a passenger's legs when used, and the first sensor and the second sensor are configured to detect the force caused by the passenger's legs when used.

According to certain examples, the entertainment system further includes a base having a first side edge, a second side edge, an upper surface, and a lower surface. The first sensor and the second sensor are secured on the upper surface of the base between the first side edge and the second side edge.

In some examples, the base further includes a center section between the first side edge and the second side edge, a first flexible section between the center section and the first side edge, and a second flexible section between the center section and the second side edge. In various aspects, the first flexible section and the second flexible section include a first fabric material, and the center section includes a second fabric material different from the first fabric material. In some examples, the first fabric material is more elastic than the second fabric material, and the first sensor and the second sensor are secured on the center section.

According to some aspects, the entertainment system includes at least one force sensor, and the at least one force sensor includes at least one of a piezoelectric textile sensor, a force sensor resistor, a strain gauge sensor, an accelerometer, or a foam sensor. In certain examples, the entertainment system further includes a controller configured to communicate with the at least one force sensor to receive sensed force data and communicate the sensed force data with an IFE device such that the IFE device runs an application based on the sensed force data.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
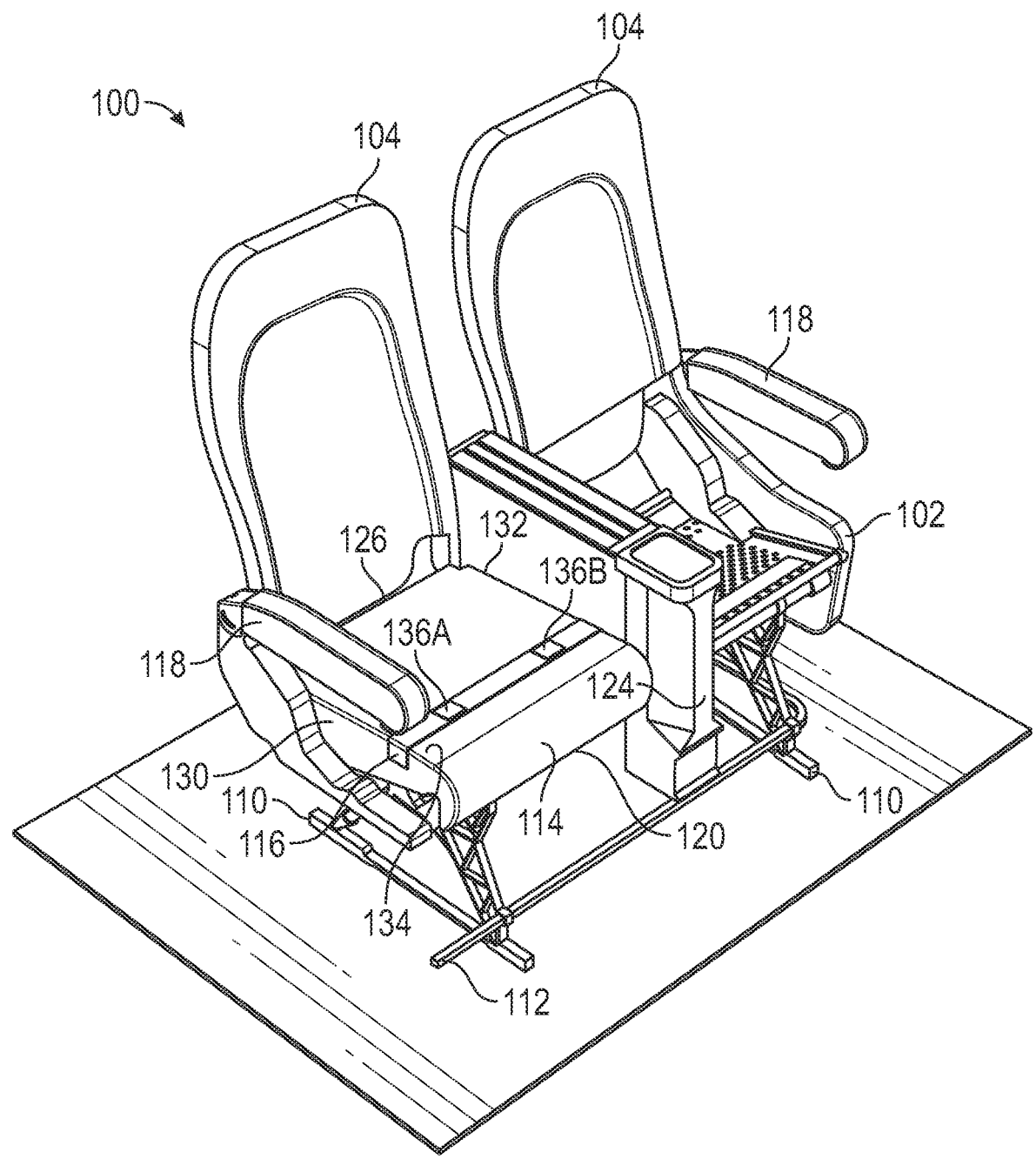
FIG. 1 is a front perspective view of a passenger seat assembly with an entertainment system according to aspects of the current disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "op," "left," "right," "front," "back," and "corners," among others are intended to refer to the orientation as illustrated and described in the figure (or figures) to which the components and directions are referencing.

Oftentimes, passengers remain in the same or substantially the same position during travel. However, sitting still for a long period of time causes stiffness and discomfort. Moreover, during longer travel periods, such as during long haul flights, the experience of discomfort can become significant and even cause health issues. Discomfort is an important factor for comfort ratings, and a correlation exists between passenger comfort and the likeliness of the passenger to choose the same airline again. Therefore, reducing passenger discomfort provides various carriers, such as airlines, with the opportunity to increase the passenger experience and gain more returning customers.

In one aspect, disclosed is an entertainment system for a passenger seat, such as an aircraft passenger seat, and associated methods, systems, devices, and various apparatus. The entertainment system is positioned between the cushioning member and the cover and is removably connected to the cushioning member. The entertainment system is configured to determine a force caused by a passenger's legs in at least two locations on an upper surface of the seat base when used. It would be understood by one of skill in the art that the disclosed entertainment system is described in but a few exemplary aspects among many.

The entertainment system is configured to engage passengers in unobtrusive exercises in their passenger seat by playing a game while seated. In some aspects, the entertainment system detects and monitors movements of the legs of the seat occupant such that the movements act as a controller for a game on an IFE system. In some examples, the entertainment system allows passengers to play a game using movements of their body as a controller to promote movement of the passenger and stimulate the passenger such that the passenger feels refreshed and energized during and after travel, such as during and after a flight. In certain examples, the entertainment system includes sensors within a passenger seat that detect movement and are triggered by the movement of the passenger. In some cases, these sensed movements are directed to the IFE system and presented to the user as a game to provide feedback to the user. Optionally, the cover of a passenger seat with the entertainment system includes indicators to alert passengers that the particular passenger seat includes the entertainment system.

FIGS. 1-7 illustrate an example of a passenger seat assembly 100. The passenger seat assembly 100 includes a base 102 and a backrest 104. In the present example, the passenger seat assembly 100 is capable of carrying a quantity of two passengers, and accordingly has two backrests 104. However, it will be appreciated that in various other examples, the passenger seat assembly 100 can be capable of carrying any desired number of passengers, such as one passenger, two passengers, three passengers, four passengers, or any other desired number of passengers. In these examples, the passenger seat assembly 100 can likewise have any desired number of corresponding backrests 104. The base 102 and the backrest 104 each include various frame members. A base cushioning member 114 covers the frame members of the base 102. As described in detail below, an entertainment system 116 is provided on the base cushioning member 114, and is optionally removably connected to the base cushioning member 114 such that the entertainment system 116 may be replaced as needed or desired.

The passenger seat assembly 100 may also include a cover layer 106 (see FIG. 5) that covers the base 102 and backrest 104, including the base cushioning member 114 and the entertainment system 116 when installed. Armrests 118, headrests 166 (see FIG. 6), tray tables 122 (see FIGS. 5 and 6), and/or legs 110 may also be included. Depending on the type of passenger seat assembly 100, a middle console 124 may be included to house the tray table 122 when stowed (see FIG. 1). In other examples, the tray tables 122 may be at various other locations, including, but not limited to, an aft side of the backrest 104. In some cases, the passenger seat assembly 100 optionally includes a luggage bar 112, although it need not. In various cases, the passenger seat assembly 100 may also optionally include an In-Flight Entertainment (IFE) monitor 128 (see FIG. 6), although it need not.

Referring back to the cushioning member 114, the cushioning member 114 includes a forward edge 120, an aft edge 126, a first side 130, a second side 132, and an upper surface 134 extending from the forward edge 120 to the aft edge 126. The cushioning member 114 may be constructed from various materials suitable for providing cushioning and support to the passenger when used, including, but not limited to, various foams such as polyurethane foam, gels, fluids, or various other suitable cushioning materials.

Figure 3:
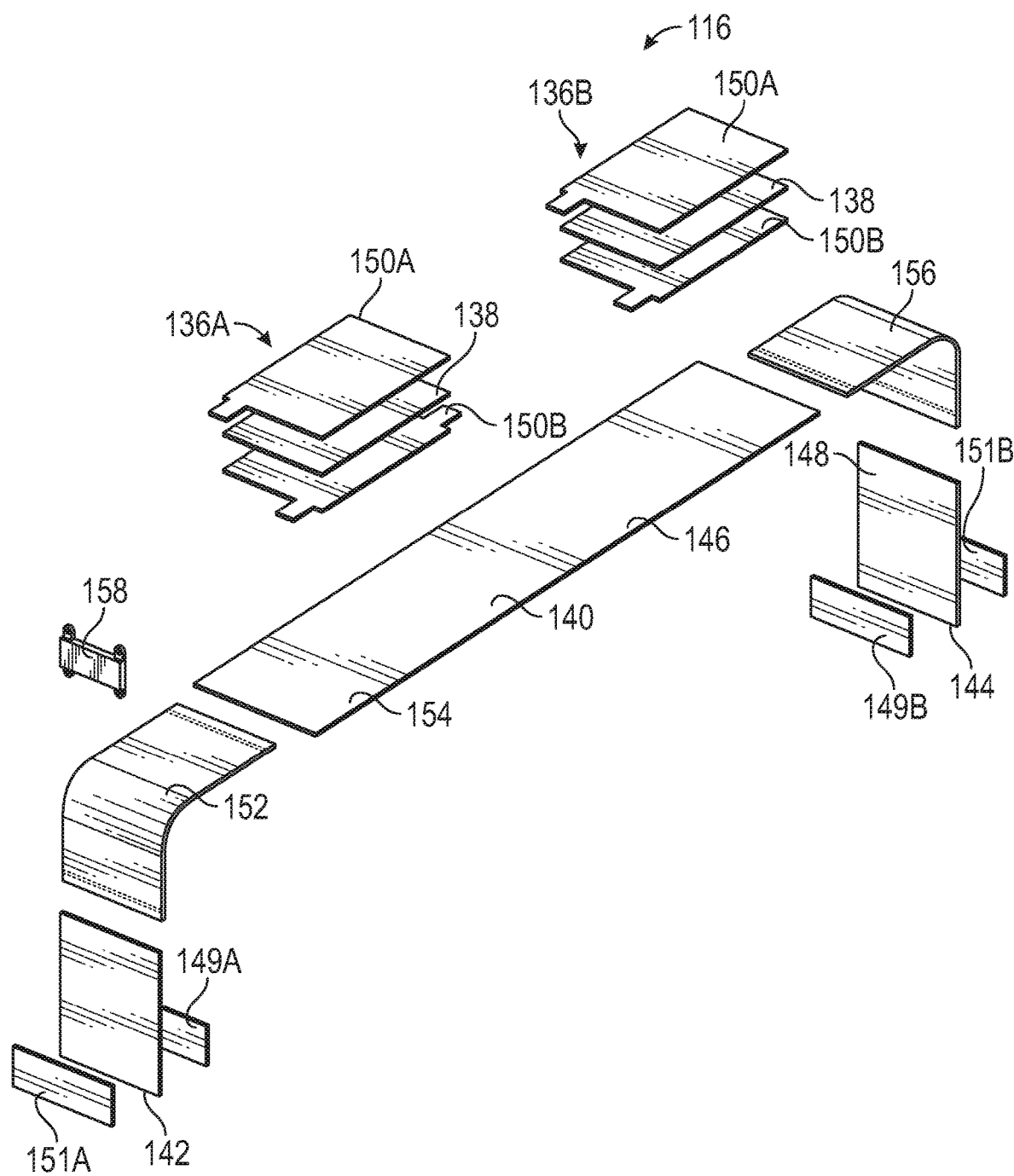
FIG. 3 is an exploded assembly view of the entertainment system of FIG. 1.
Figure 4:
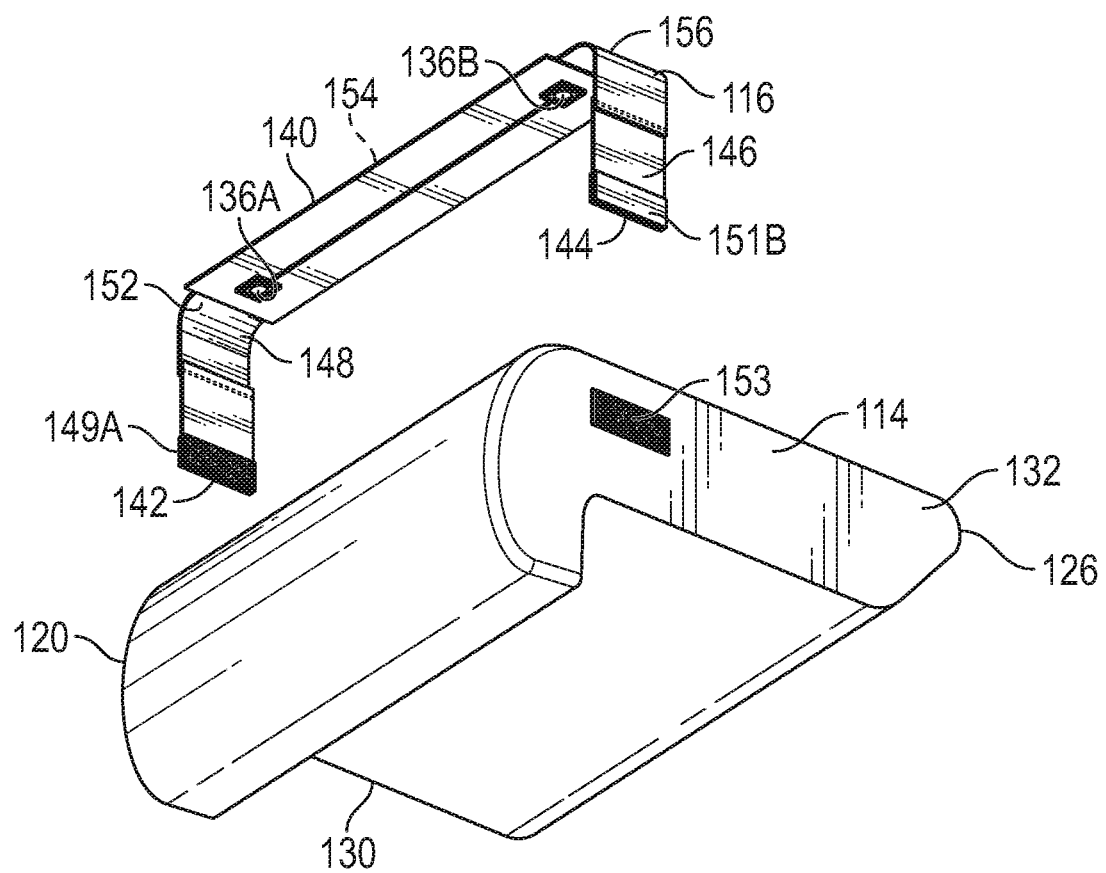
FIG. 4 is an exploded assembly view of a seat base of the passenger seat assembly and the entertainment system of FIG. 1.

In some examples, the entertainment system 116 includes a first sensor 136A at a first location on the cushioning member 114 and a second sensor 136B at a second location on the cushioning member 114. Although two sensors are shown, it will be appreciated that any number of sensors may be provided with the entertainment system 116, such as one sensor or more than two sensors. The sensors 136A-B are force sensors that are configured to detect a force applied by the passenger's legs on the seat base 102 at the respective first and second locations. In various examples, the sensors 136A-B may be various suitable sensors including, but not limited to, strain gauge sensors, accelerometers, foam sensors, textile sensors, or various other suitable sensors. As one non-limiting example, in some cases, the sensors 136A-B are piezoelectric textile sensors. Referring to FIG. 3, textile sensors optionally may have a three-layered architecture of a semi-resistive core 138 with outer layers 150A-B of conductive metal-coated fabric, although various other combinations of layers and/or materials may be used. In some examples, the sensors 136A-B are configured to be flexible to reduce abrasion or other wear when passengers move in their seats. In certain examples, the sensors 136A-B are configured to operate for a minimum number of cycles or uses. As one non-limiting examples, in some cases, the sensors 136A-B are configured to operate for about 10 years, although various other time periods may be used. In other examples, various other types of sensors may be provided to detect force and movement of the passenger.

In various examples, a distance between the first location and the second location is a spacing distance. In some examples, the spacing distance corresponds to a distance such that the sensors 136A-B are positioned beneath corresponding legs of the passenger when used. In some examples, the spacing distance between the sensors 136A-B is from about 170 mm to about 210 mm, such as about 190 mm. The sensors 136A-B may also be positioned at an edge distance from the forward edge 120 of the cushioning member 114. In some examples, the edge distance is from about 100 mm to about 140 mm, such as about 125 mm. In various examples, positioning the sensors 136A-B at the spacing distance and the edge distance may center the sensors 136A-B such that the sensors 136A-B align with pressure points created by the passenger's legs when seated.

Figure 2:
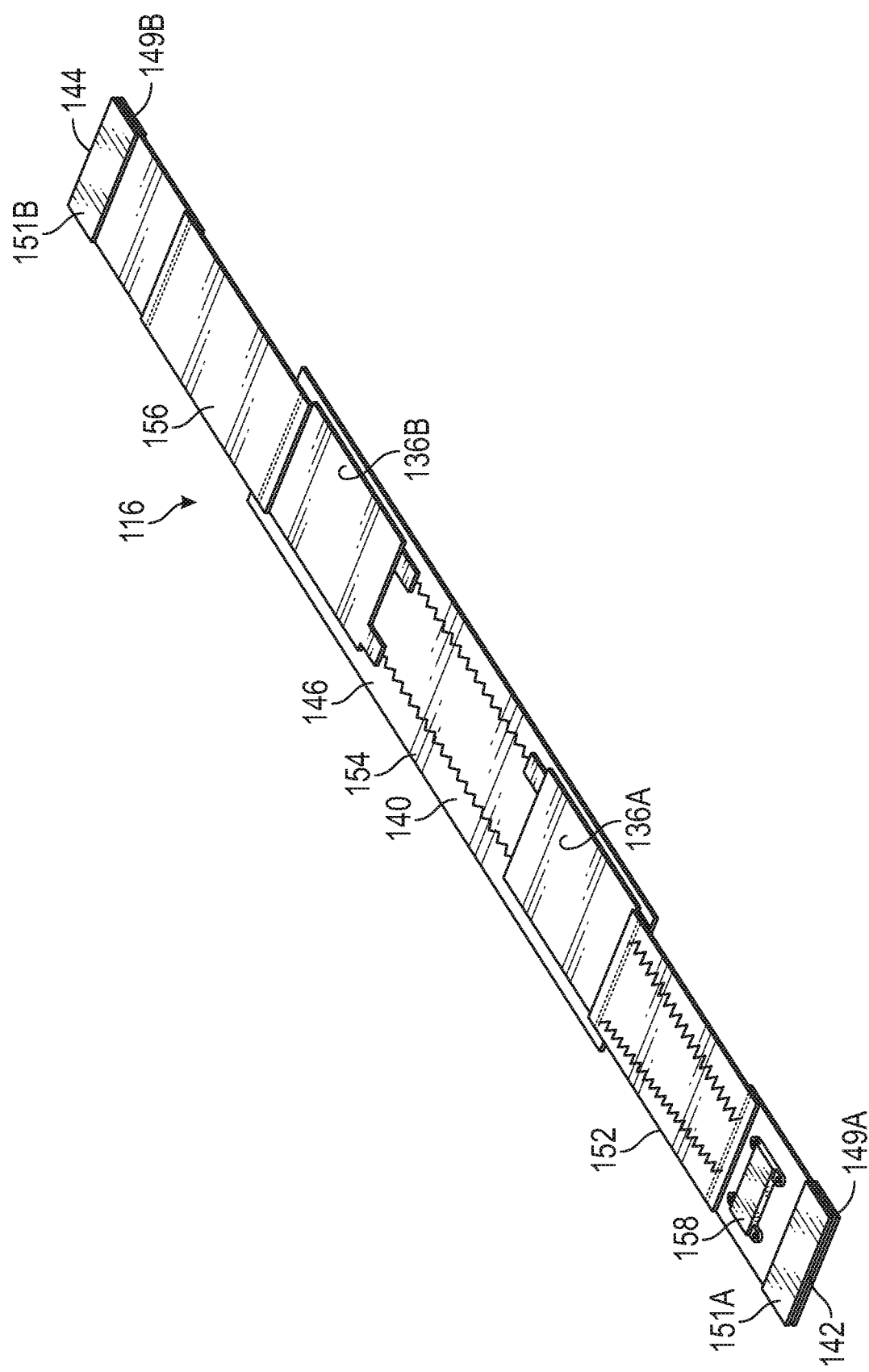
FIG. 2 is a perspective view of the entertainment system of FIG. 1.

In certain examples, the entertainment system 116 optionally includes a base 140. As illustrated in FIGS. 2 and 3, the base 140 includes a first side edge 142, a second side edge 144, an upper surface 146, and a lower surface 148. In some examples, the sensors 136A-B are secured on the upper surface 146 of the base 140. The sensors 136A-B may be secured through various securing mechanisms including, but not limited to, various adhesives, glues, tapes, bonding agents, sewing, stitching, hook and loop fasteners, and various other mechanisms suitable for securing the sensors 136A-B relative to the base 140.

Figure 7:
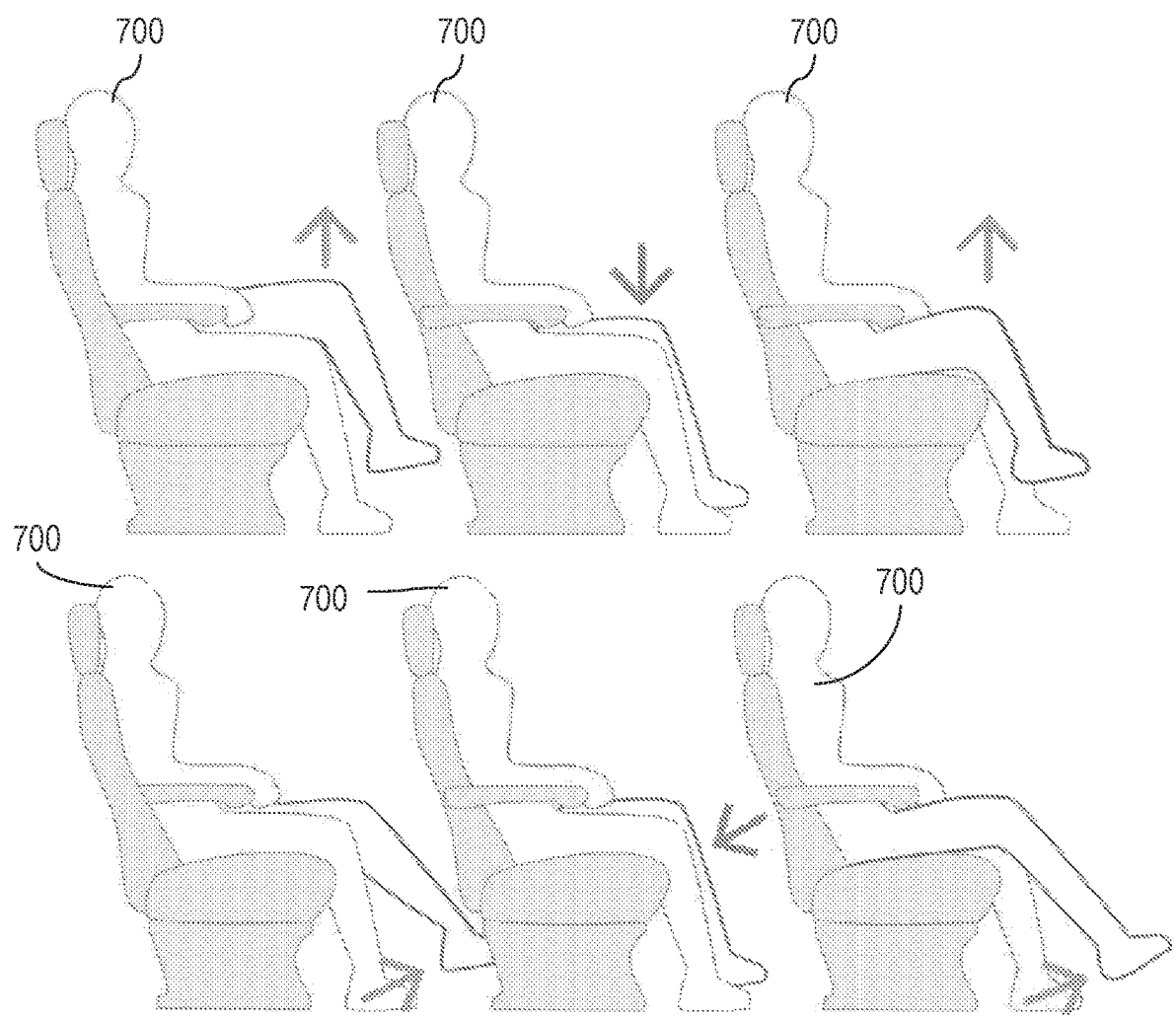
FIG. 7 is a schematic of various exemplary movements sensed by the entertainment system of FIG. 1 according to aspects of the current disclosure.

The entertainment system 116 also includes a controller 158 in communication with the sensors 136A-B such that the controller 158 receives and processes the sensed force data from the sensors 136A-B. In some examples, the controller 158 is secured to the base 140, although it need not be. The controller 158 includes a processor, which may be a general purpose computer, special purpose computer, and/or other programmable data processing apparatus, and a memory, which stores various instructions that may be executed by the processor. The memory is a computer-usable or computer-readable medium that may be any non-transitory medium that is not a transitory signal and can contain or store the program or instructions for use by or in connection with the instruction or execution of a system, apparatus, or device. The controller 158 may also include various other components such as a communication module, which includes the components necessary for the entertainment system 116 to establish wired or wireless communication (e.g., cellular communication, Wi-Fi, Bluetooth, etc.) with an entertainment device, which may be the IFE monitor 128 or other IFE device, a passenger's personal electronic device such as a phone, tablet, laptop, computer, etc., or various other devices. In some examples, the controller 158 or the device receiving the sensed force data from the controller 158 is configured to run an application based on the sensed force data such that entertainment data 160 (see FIG. 6), such as a game, based on the sensed force data is presented to the passenger. In one non-limiting examples, the controller 158 is configured to translate the sensed force data into joystick movements for the entertainment data 160 such that the passenger's movements serve as a game controller. FIG. 7 illustrates examples of some movements of a passenger 700 that may change the force sensed by the sensors 136A-B.

Referring to FIGS. 2 and 3, in some examples, the base 140 optionally includes a center section 154 between the first side edge 142 and the second side edge 144. In some examples, a first flexible section 152 is between the first side edge 142 and center section 154, and a second flexible section 156 is between the center section 154 and the second side edge 144. In some examples, the first flexible section 152 and the second flexible section 156 may be constructed from a first material and the center section 154 may be constructed from a second material. In some cases, the first material is a first fabric material and the second material is a second fabric material that is less elastic or flexible than the first fabric material. For example, in some cases, the first fabric material is stretchable and/or extendable relative to the second fabric material. As one non-limiting example, in some cases, the first material is knitted nylon and the second material is woven nylon. Various other materials may be used as the first and second material. In other examples, a single material may be used to construct the base 140. In some examples, the sensors 136A-B are optionally secured on the center section 154.

In various examples, the base 140 optionally includes fasteners 149 for removably connecting the entertainment system 116 to the cushioning member 114. As one non-limiting example, in some cases, a first fastener 149A is provided on the lower surface 148 of the base 140 adjacent to the first side edge 142 and a second fastener 149B is provided on the lower surface 148 of the base 140 adjacent to the second side edge 144. In various examples, the fasteners 149A-B are configured to engage with corresponding cushion fasteners 153 (see FIG. 4). The fasteners 149 may be various suitable fastening mechanisms including, but not limited to, hook and loop fasteners, snaps, clips, stitching, clasps, hooks, pins, bolts, screws, tapes, or various other mechanisms suitable for removably connecting the entertainment system 116 to the cushioning member 114. Through the fasteners 149, the entertainment system 116 may be removed from the cushioning member 114 as needed, such as during installation, repair, replacement, etc. Optionally, in some examples, the fasteners 149 are minimally invasive into the cushioning member 114 such that the fasteners 149 do not damage the cushioning member 114 or otherwise disrupt how the cushioning member 114 is designed to function.

In some optional examples, the base 140 may further include cover fasteners 151A-B on the upper surface 146 of the base 140. The cover fasteners 151A-B may be substantially similar to the fasteners 149 except that the cover fasteners 151A-B are configured to removably connect the entertainment system 116 to the portion of the cover layer 106 of the passenger seat assembly 100 that covers the cushioning member 114.

In various cases, a power source may be provided with the entertainment system 116. The power source may be various power sources suitable for the entertainment system such as replaceable batteries, existing power sources of the passenger vehicle, etc.

Figure 5:
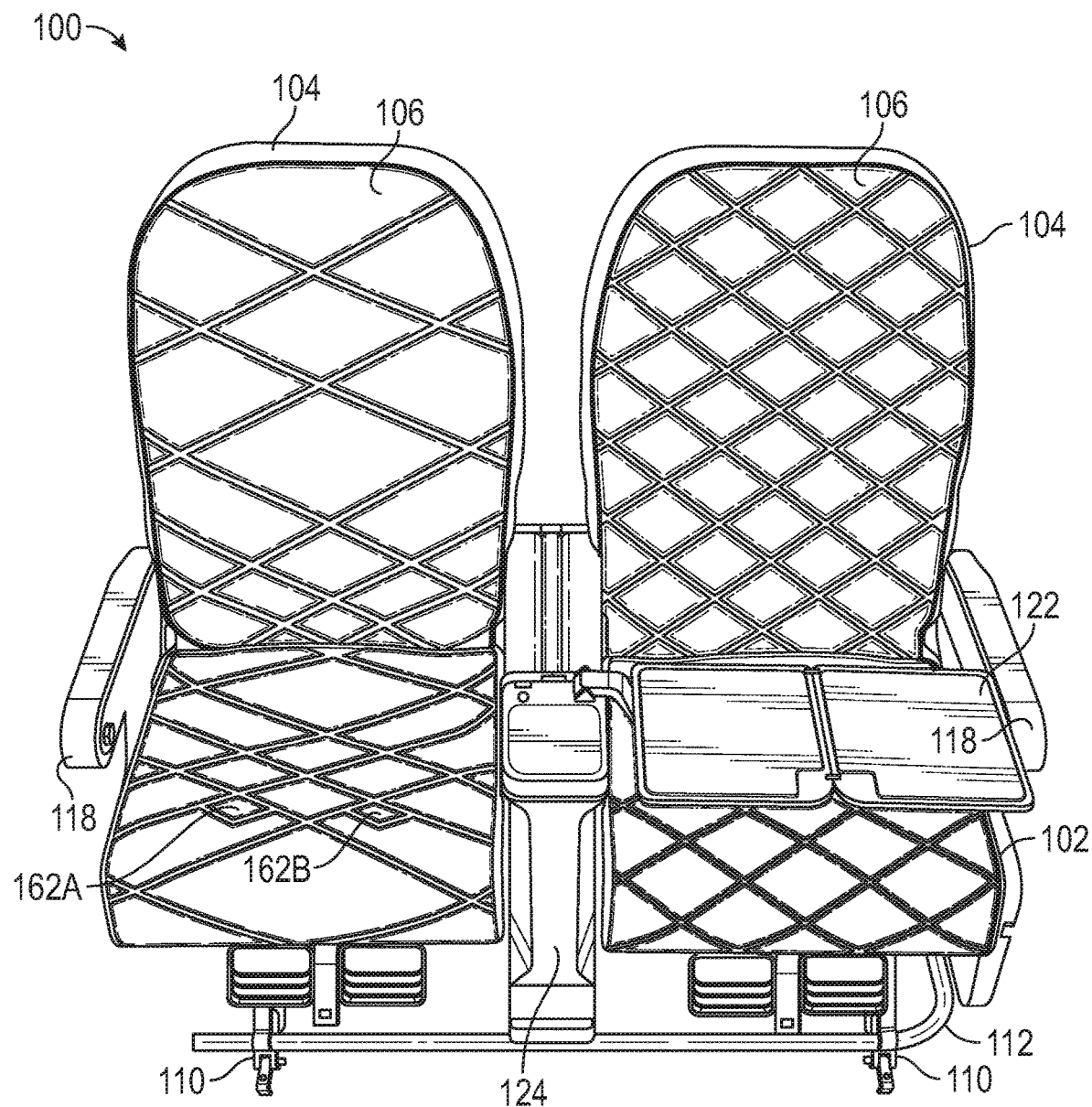
FIG. 5 is another perspective view of the passenger seat assembly of FIG. 1.
Figure 6:
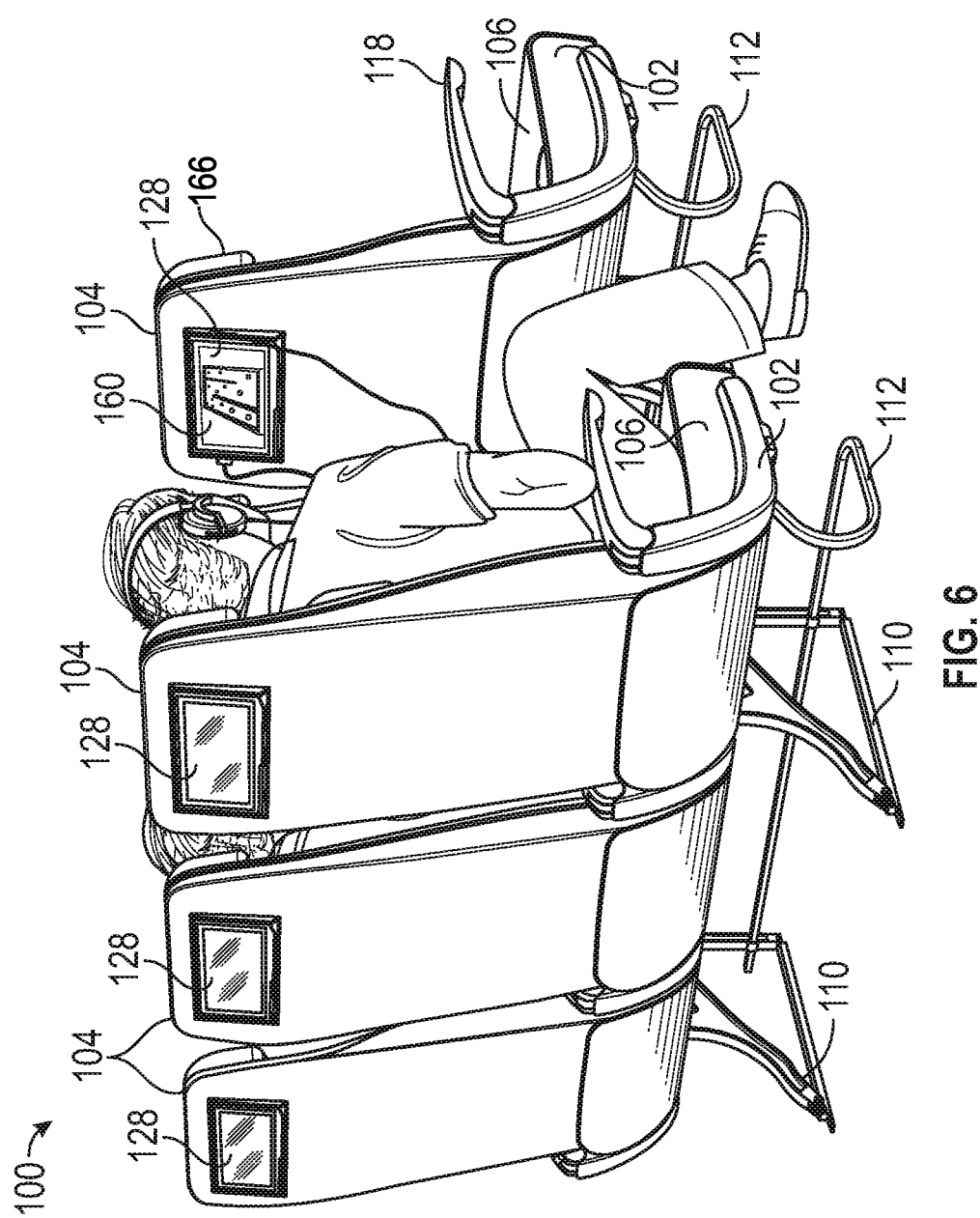
FIG. 6 is another perspective view of the passenger seat assembly of FIG. 1.

Referring to FIG. 5, in various examples, the entertainment system 116 is provided on at least one base cushioning member 114 between the cover layer 106 and the base cushioning member 114. In some examples, the cover layer 106 covering the entertainment system 116 may include a first indicator 162A corresponding to the first sensor 136A and a second indicator 162B corresponding to the second sensor 136B. In various cases, the number and location of the indicators 162 corresponds with the number and location of the sensors 136. The indicators 162A-B are provided to alert the passenger that the particular passenger seat includes the entertainment system 116. In various cases, the indicators 162A-B may be various suitable indicators such as lights, decals, stamps, various stitching patterns such as arrows, diamonds, circles, ovals, or various other patterns, or various other suitable indicators.

Figure 8:
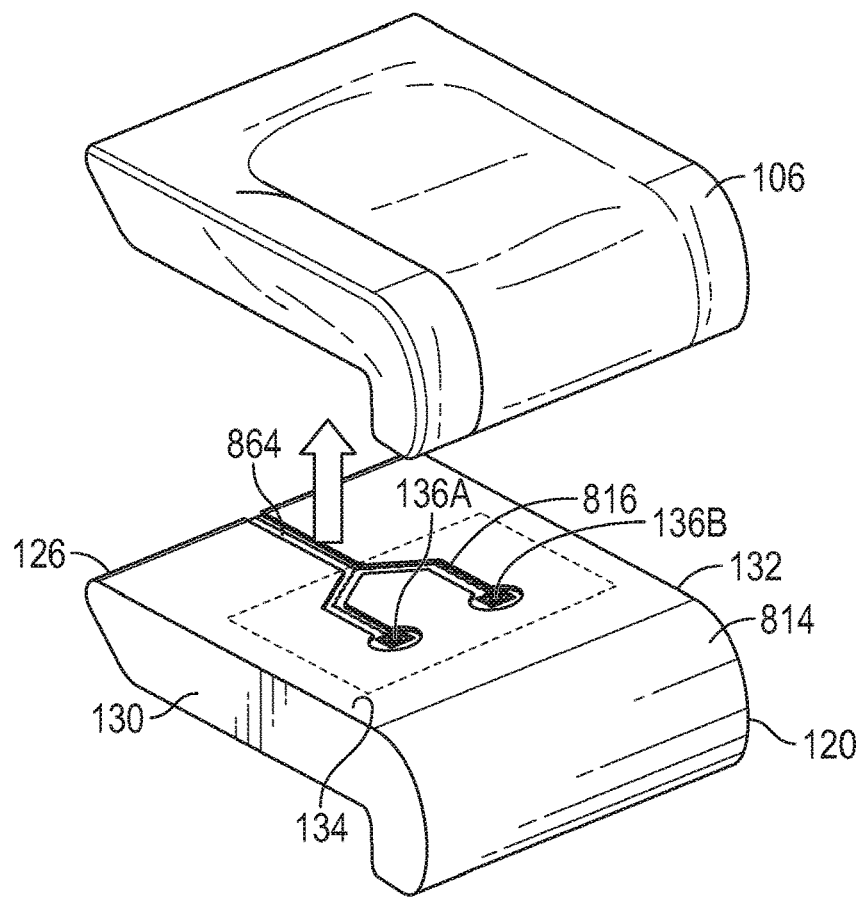
FIG. 8 is an exploded assembly view of a seat base of a passenger seat assembly and an entertainment system according to aspects of the current disclosure.
Figure 9:
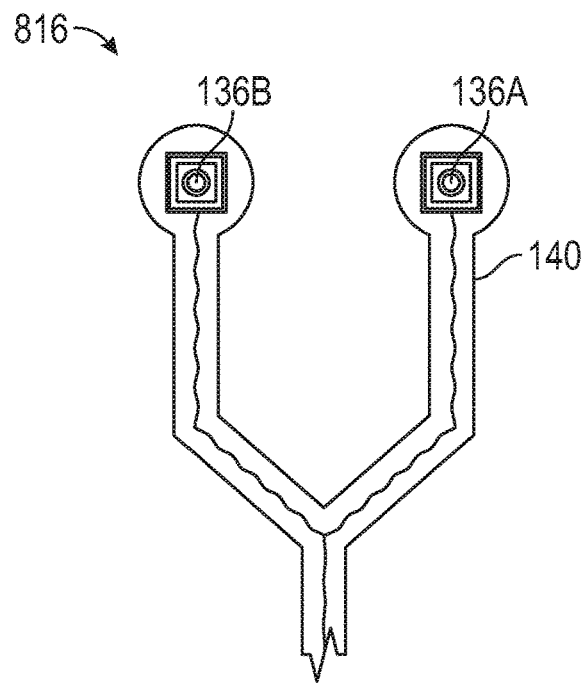
FIG. 9 is a top view of the entertainment system of FIG. 8.

FIGS. 8 and 9 illustrate another example of a base cushioning member 814 and an entertainment system 816. Compared to the base cushioning member 114, the base cushioning member 814 includes an entertainment cavity 864 that is configured to receive the entertainment system 816. Compared to the entertainment system 116, the shape of the base 102 of the entertainment system 816 is modified such that the entertainment system 816 may be housed within the entertainment cavity 864.

Figure 10:
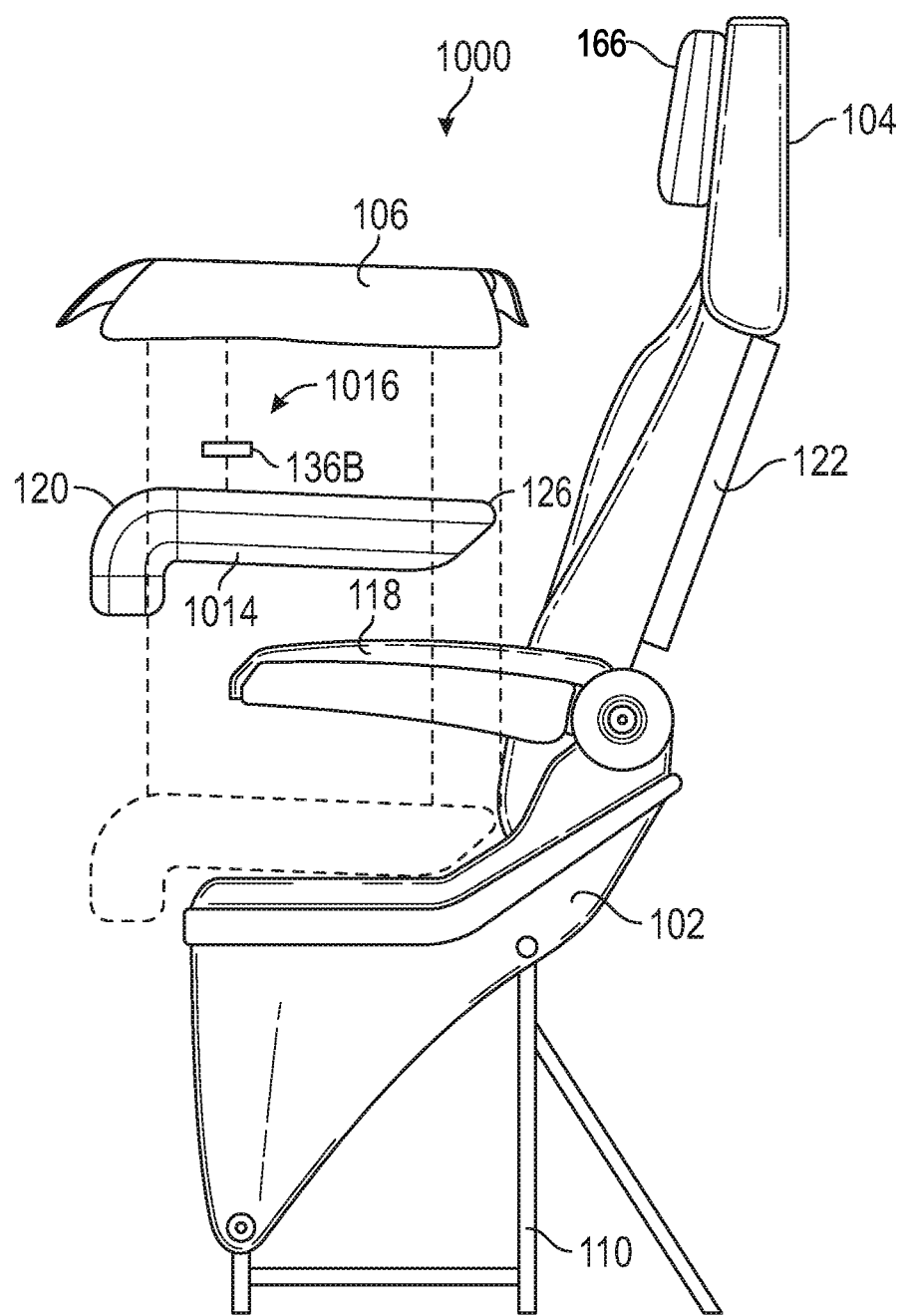
FIG. 10 is an exploded side view of a passenger seat assembly with an entertainment system according to aspects of the current disclosure.
Figure 11:
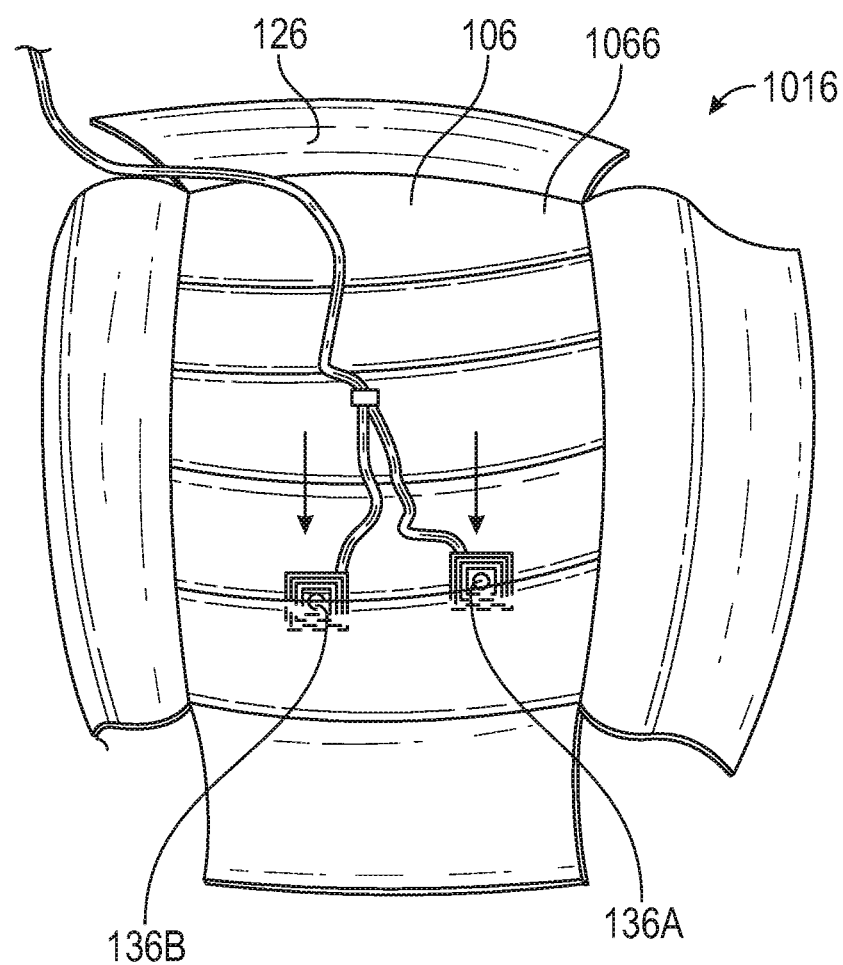
FIG. 11 is a bottom view of a seat base of the passenger seat assembly and the entertainment system of FIG. 10.
Figure 12:
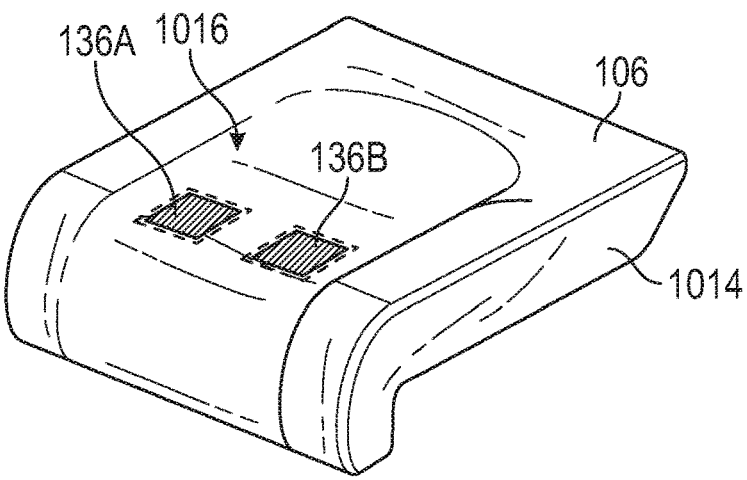
FIG. 12 is a top perspective view of the seat base and entertainment system of FIG. 10.

FIGS. 10-12 illustrate another example of a passenger seat assembly 1000 with a base cushioning member 1014 and an entertainment system 1016. Compared to the entertainment systems 116 and 816, the sensors 136A-B of the entertainment system 1016 are secured to a portion of the inner surface 1066 of the cover layer 106 covering the base cushioning member 1014.

Figure 13:
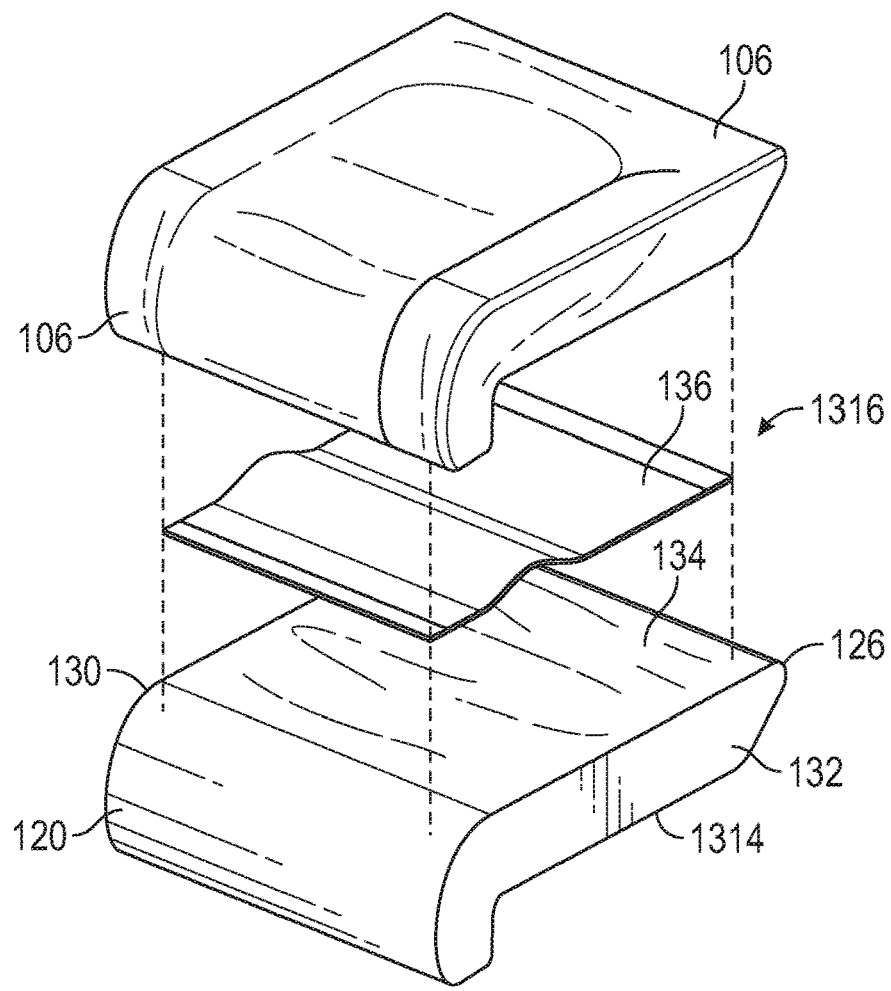
FIG. 13 is an exploded assembly view of a seat base of a passenger seat assembly and an entertainment system according to aspects of the current disclosure.
Figure 14:
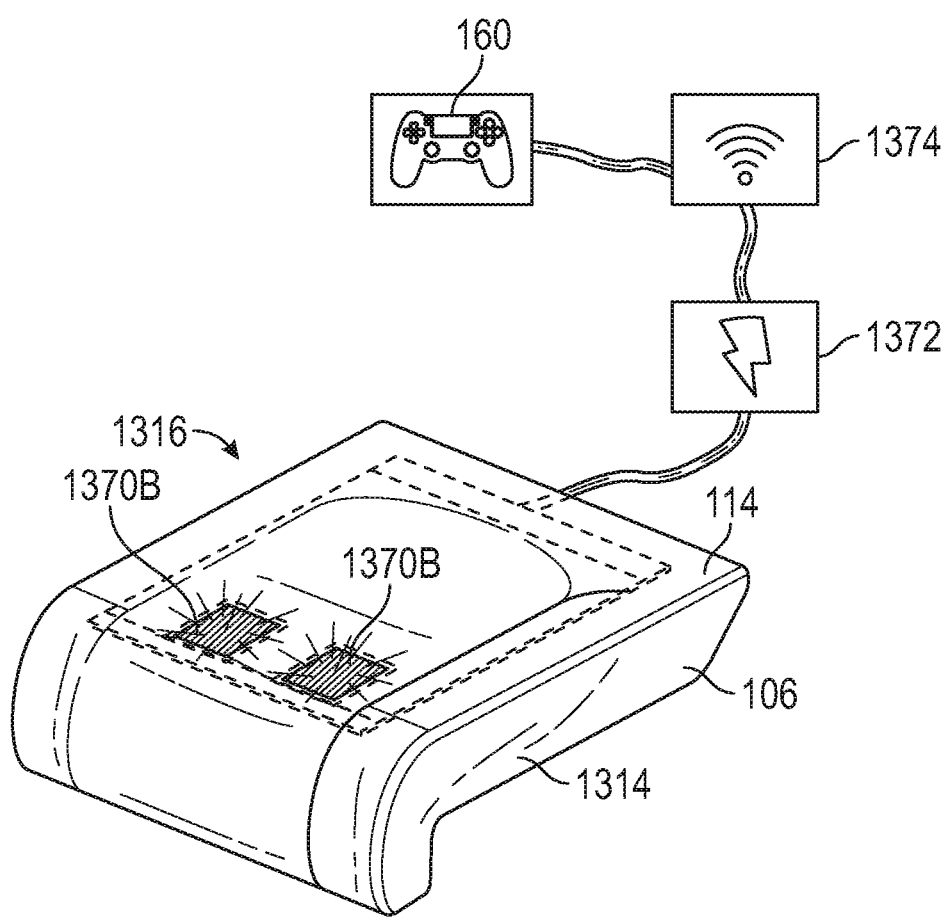
FIG. 14 is a perspective view of the seat base of FIG. 13.

FIGS. 13 and 14 illustrate another example of a base cushioning member 1314 and an entertainment system 1316. Compared to the entertainment systems 116, 816, and 1016, the entertainment system 1316 includes a single sensor 136 that covers a majority of the upper surface 134 of the base cushioning member 1314. The single sensor 136 is configured to detect localized forces at various locations on the upper surface 134. For example, similar to the entertainment system 116, the single sensor 136 is configured to detect forces at a first location 1370A and a second location 1370B. As illustrated in FIG. 14, the entertainment system 1316 includes a power source 1372 and a communications module 1374 of the controller such that the entertainment data 160 may be provided to the passenger. The connections between the various components of the entertainment system 1316 may be wired or wireless connections.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive, and the invention is not limited to these example embodiments but rather encompasses all possible modifications and variations within the scope of the issued claims and their equivalents.

EC 1. A passenger seat comprising: a seat base, the seat base comprising: a cushioning member; and a cover covering the cushioning member; and an entertainment system positioned between the cushioning member and the cover, the entertainment system comprising: a first sensor at a first location; and a second sensor at a second location, wherein the entertainment system is positioned such that the first sensor and the second sensor are aligned with a passenger's legs when used, and wherein the first sensor and the second sensor are configured to detect a force applied by the passenger's legs on the entertainment system when used.

EC 2. The passenger seat of any of the preceding or subsequent example combinations, wherein the cushioning member comprises a forward edge and an aft edge, wherein a distance between the first sensor and the second sensor is a spacing distance, wherein the first sensor and the second sensor are positioned at an edge distance from the forward edge, and wherein the edge distance is less than the spacing distance.

EC 3. The passenger seat of the preceding or subsequent example combinations, wherein the first sensor and the second sensor each comprise at least one of a piezoelectric textile sensor, a force sensor resistor, a strain gauge sensor, an accelerometer, or a foam sensor.

EC 4. The passenger seat of the preceding or subsequent example combinations, wherein the entertainment system further comprises a base comprising: a first side edge; a second side edge; an upper surface; and a lower surface, wherein the first sensor and the second sensor are secured on the upper surface of the base between the first side edge and the second side edge.

EC 5. The passenger seat of the preceding or subsequent example combinations, wherein the base further comprises: a first flexible section between the first side edge and the second side edge; a center section between the first flexible section and the second side edge; and a second flexible section between the center section and the second side edge, wherein the first flexible section and the second flexible section comprise a first fabric material, wherein the center section comprises a second fabric material different from the first fabric material, wherein the first fabric material is more elastic than the second fabric material, and wherein the first sensor and the second sensor are secured on the center section.

EC 6. The passenger seat of the preceding or subsequent example combinations, wherein the entertainment system further comprises a controller secured to the base, wherein the controller is configured to: communicate with the first sensor and the second sensor to receive sensed force data; and communicate the sensed force data with an IFE device such that the IFE device runs an application based on the sensed force data.

EC 7. The passenger seat of the preceding or subsequent example combinations, wherein the cover comprises an inner surface and an outer surface, and wherein the outer surface comprises a first indicator corresponding with the first sensor and a second indicator corresponding with the second sensor.

EC 8. An entertainment system for a passenger seat comprising: a base comprising: a first side edge; a second side edge; an upper surface; and a lower surface; a first sensor secured to the upper surface of the base between the first side edge and the second side edge; and a second sensor secured to the upper surface of the base between the first sensor and the second side edge, wherein the first sensor and the second sensor are each configured to detect a force applied to the entertainment system, and wherein the base is configured to be positioned between a cushioning member and a cover of a base of a passenger seat.

EC 9. The entertainment system of the preceding or subsequent example combinations, further comprising a controller secured to the base, wherein the controller is configured to: communicate with the first sensor and the second sensor to receive sensed force data; and communicate the sensed force data with an IFE device.

EC 10. The entertainment system of the preceding or subsequent example combinations, wherein the base further comprises: a first flexible section between the first side edge and the second side edge; a center section between the first flexible section and the second side edge; and a second flexible section between the center section and the second side edge, wherein the first flexible section and the second flexible section comprise a first fabric material, wherein the center section comprises a second fabric material different from the first fabric material, wherein the first fabric material is more elastic than the second fabric material, and wherein the first sensor and the second sensor are secured on the center section.

EC 11. The entertainment system of the preceding or subsequent example combinations, wherein the first fabric material comprises knitted nylon, and wherein the second fabric material comprises woven nylon.

EC 12. The entertainment system of the preceding or subsequent example combinations, further comprising a sleeve slidably positioned around at least the center section.

EC 13. The entertainment system of the preceding or subsequent example combinations, wherein the spacing distance is from about 170 mm to about 210 mm.

EC 14. The entertainment system of the preceding or subsequent example combinations, further comprising: a first connector on the lower surface of the base and adjacent to the first side edge; and a second connector on the lower surface of the base and adjacent to the second side edge, wherein the first connector and the second connector are configured to removably connect the entertainment system to the cushioning member.

EC 15. A passenger seat comprising: a seat base, the seat base comprising: a cushioning member; and a cover covering the cushioning member; and an entertainment system positioned between the cushioning member and the cover and removably connected to the cushioning member, wherein the entertainment system is configured to determine a force caused by a passenger's legs in at least two locations on an upper surface of the seat base when used.

EC 16. The passenger seat of the preceding or subsequent example combinations, wherein the entertainment system comprises: a first sensor at a first location; and a second sensor at a second location, wherein the entertainment system is positioned such that the first sensor and the second sensor are aligned with a passenger's legs when used, and wherein the first sensor and the second sensor are configured to detect the force caused by the passenger's legs when used.

EC 17. The passenger seat of the preceding or subsequent example combinations, wherein the entertainment system further comprises a base comprising: a first side edge; a second side edge; an upper surface; and a lower surface, wherein the first sensor and the second sensor are secured on the upper surface of the base between the first side edge and the second side edge.

EC 18. The passenger seat of the preceding or subsequent example combinations, wherein the base further comprises: a first flexible section between the first side edge and the second side edge; a center section between the first flexible section and the second side edge; and a second flexible section between the center section and the second side edge, wherein the first flexible section and the second flexible section comprise a first fabric material, wherein the center section comprises a second fabric material different from the first fabric material, wherein the first fabric material is more elastic than the second fabric material, and wherein the first sensor and the second sensor are secured on the center section.

EC 19. The passenger seat of the preceding or subsequent example combinations, wherein the entertainment system comprises at least one force sensor, and wherein the at least one force sensor comprises at least one of a piezoelectric textile sensor, a force sensor resistor, a strain gauge sensor, an accelerometer, or a foam sensor.

EC 20. The passenger seat of the preceding or subsequent example combinations, wherein the entertainment system further comprises a controller, wherein the controller is configured to: communicate with the at least one force sensor to receive sensed force data; and communicate the sensed force data with an In-Flight Entertainment (IFE) device such that the IFE device runs an application based on the sensed force data.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. An entertainment system for a passenger seat comprising:
   a base comprising:
      a first side edge;
      a second side edge;
      an upper surface; and
      a lower surface;
   a first sensor secured to the upper surface of the base between the first side edge and the second side edge; and
   a second sensor secured to the upper surface of the base between the first sensor and the second side edge,
   at least one connector on the lower surface of the base and adjacent one of the first side edge and the second side edge;
   wherein the at least one connector is configured to removably connect the entertainment system to a cushioning member;
   wherein the at least one connector comprises a first connector on the lower surface of the base and adjacent to the first side edge, a second connector on the lower surface of the base and adjacent to the second side edge;
   wherein the first sensor and the second sensor are each configured to detect a force applied to the entertainment system; and
   wherein the base is configured to be positioned between the cushioning member and a cover of a base of the passenger seat.

2. The entertainment system of claim 1, further comprising:
   a controller secured to the base, wherein the controller is configured to:
      communicate with the first sensor and the second sensor to receive sensed force data; and
      communicate the sensed force data with an In-Flight Entertainment (IFE) device.

3. The entertainment system of claim 1, wherein the base further comprises:
   a center section between the first side edge and the second side edge;
   a first flexible section between the center section and the first side edge; and
   a second flexible section between the center section and the second side edge,
   wherein the first flexible section and the second flexible section comprise a first fabric material,
   wherein the center section comprises a second fabric material different from the first fabric material,
   wherein the first fabric material is more elastic than the second fabric material, and
   wherein the first sensor and the second sensor are secured on the center section.

4. The entertainment system of claim 3, wherein the first fabric material comprises knitted nylon, and wherein the second fabric material comprises woven nylon.

5. The entertainment system of claim 1, further comprising a base cushion fastener on the lower surface of the base and a cover fastener on the upper surface of the base.

6. The entertainment system of claim 1, wherein a distance between the first sensor and the second sensor is from about 170 mm to about 210 mm.

7. An entertainment system for a passenger seat comprising:
   a base comprising:
      a first side edge;
      a second side edge;
      an upper surface having a cover fastener; and
      a lower surface having a base cushion fastener;
   a first sensor secured to the upper surface of the base between the first side edge and the second side edge; and
   a second sensor secured to the upper surface of the base between the first sensor and the second side edge,
   wherein the first sensor and the second sensor are each configured to detect a force applied to the entertainment system, and wherein the base is configured to be positioned between a cushioning member and a cover of a base of the passenger seat.

8. The entertainment system of claim 7, further comprising:
- a controller secured to the base, wherein the controller is configured to:
  - communicate with the first sensor and the second sensor to receive sensed force data; and
  - communicate the sensed force data with an In-Flight Entertainment (IFE) device.

9. The entertainment system of claim 7, wherein the base further comprises:
- a center section between the first side edge and the second side edge;
- a first flexible section between the center section and the first side edge; and
- a second flexible section between the center section and the second side edge,
- wherein the first flexible section and the second flexible section comprise a first fabric material,
- wherein the center section comprises a second fabric material different from the first fabric material,
- wherein the first fabric material is more elastic than the second fabric material, and
- wherein the first sensor and the second sensor are secured on the center section.

10. The entertainment system of claim 9, wherein the first fabric material comprises knitted nylon, and wherein the second fabric material comprises woven nylon.

11. The entertainment system of claim 9, wherein a distance between the first sensor and the second sensor is from about 170 mm to about 210 mm.

12. The entertainment system of claim 7, further comprising:
- a first connector on the lower surface of the base and adjacent to the first side edge; and
- a second connector on the lower surface of the base and adjacent to the second side edge.

* * * * *